United States Patent Office 3,582,493
Patented June 1, 1971

---

3,582,493
METHOD FOR PREPARING RARE EARTH OXIDE PHOSPHORS
James W. Haynes and Jesse J. Brown, Jr., Towanda, Pa., assignors to Sylvania Electric Products, Inc.
No Drawing. Filed July 20, 1967, Ser. No. 654,702
Int. Cl. C09k 1/10
U.S. Cl. 252—301.4R ......... 3 Claims

ABSTRACT OF THE DISCLOSURE

Phosphors of yttrium and/or gadolinium oxide host materials containing europium, terbium, samarium, and/or praseodymium activators are produced by coprecipitating sulfates of the host materials and activators, and then decomposing the sulfates to the oxides.

---

Prior to the present invention, the handling characteristics of such phosphors have not been entirely satisfactory especially when the so-called dusting technique is used for applying these materials onto the face plate of a cathode ray tube. Dusting techniques can be used with powders having average bulk particle sizes between about 4 and 20 microns, but for most efficient operation, a particle size of 8–10 microns or above is necessary. Present incompatabilities arise from the lack of particle size control during the manufacturing of the powders, and particularly because of the lack of an available process to produce large particle sizes, that is above 8 microns.

According to the present invention, it is now possible to control the average bulk particle size of the $Y_2O_3$ and/or $Gd_2O_3$:Eu classes of phosphor powders within reasonably narrow particle size distribution and within the limits required for dusting techniques without sacrificing color, brightness, saturation or decay characteristics.

According to one procedure of the present invention, the hydrated sulfate of yttrium and/or gadolinium, $$Y_2(SO_4)_3 \cdot 8H_2O$$

(or its equivalent in gadolinium) is precipitated from a sulfate solution. The hydrated sulfate is carefully decomposed in air. First the water of hydration is driven off, then two $SO_3$ molecules and finally the last $SO_3$ molecule to yield the oxide, $Y_2O_3$ or $Gd_2O_3$. When the decomposition is performed in these stages, the $Y_2(SO_4)_3 \cdot 8H_2O$ or $Gd_2(SO_4)_3 \cdot 8H_2O$ particles are converted to $Y_2O_3$ or $Gd_2O_3$ in situ. The $Y_2O_3$ or $Gd_2O_3$ obtained thereby has approximately the same particle size distribution as the parent sulfate hydrate. To include the activators in this matrix, they are coprecipitated as the hydrated sulfate, i.e. $(Y, Eu)_2 (SO_4)_3 \cdot 8H_2O$ and the above described decomposition procedure is repeated to yield the phosphor $(Y, Eu)_2O_3$.

An alternative method of providing the oxide includes co-precipating europium and yttrium and/or gadolinium oxalates. The oxalates are blended with $(NH_4)_2SO_4$ and a suitable flux such as the halides of lithium, sodium and/or potassium, especially the chlorides, and fired between about 300 and 900° C. to form the sulfate [Y (and/or Gd), Eu]$_2$(SO$_4$)$_3$. The [Y (and/or Gd), Eu]$_2$(SO$_4$)$_9$ is then decomposed by volatilizing two molecules of $SO_3$ and then volatilizing one molecule of $SO_3$ to form $Y_2O_3$:Eu and/or $Gd_2O_3$:Eu.

BACKGROUND OF THE INVENTION

Field of the invention

This invention relates to the production of yttrium oxide, activated by rare earth metal ion(s), preferably trivalent europium, suitable for use as a red-emitting color television phosphor and which can be applied to a screen by the so-called dusting technique. Such techniques require a phosphor having a controlled particle size wherein substantially each particle is between about 4 and 20 microns, preferably above about 8 microns.

Summary of the invention

We have discovered methods of preparing $Y_2O_3$:Eu or $Gd_2O_3$:Eu phosphors which permit the control of the average bulk particle size of the powder from 4 to above 20 microns without introducing any deleterious effects in the luminescent characteristics of the product. Previous to this discovery, it was virtually impossible to produce $Y_2O_3$:Eu or $Gd_2O_3$:Eu phosphor powders of large particle sizes, i.e., above 8 microns, and simultaneously maintain all of the desirable luminescent properties of the material. Both embodiments described herein are based upon the preparation of yttrium or gadolinium-europium sulfate, $(Y, Eu)_2(SO_4)_3$ or $(Gd, Eu)_2(SO_4)_3$ and the subsequent decomposition of it to the phosphor $(Y, Eu)_2O_3$ or $(Gd, Eu)_2O_3$.

The first embodiment, as illustrated by Example I, involves precipitating yttrium sulfate octahydrate, $$Y_2(SO_4)_3 \cdot 8H_2O$$

which serves as the starting material. This material is then heated in stages to volatize the water of hydration and then sulfur trioxide molecules. The decomposition of the yttrium compound is in accordance with the following reaction sequence:

(A) $\quad Y_2(SO_4)_3 \cdot 8H_2O \xrightarrow{50-200°C} Y_2(SO_4)_3 + 8H_2O$ (B) $\quad Y_2(SO_4)_3 \xrightarrow{850-1150°C} Y_2O_2SO_4 + 2SO_3$ (C) $\quad Y_2O_2SO_4 \xrightarrow{1000°C-1300°C} Y_2O_3 + SO_3$ Each of the compounds can be identified by normal powder X-ray methods. In order to yield a phosphor, a suitable activator, normally europium, is co-precipitated with the yttrium and/or gadolinium sulfate hydrate, i.e., $(Y, Eu)_2(SO_3) \cdot 8H_2O$ and/or $(Gd, Eu)_2(SO_4)_3 \cdot 8H_2O$.

Once the yttrium europium sulfate hydrate has been prepared, the phosphor can be obtained by slowly decomposing the sulfate hydrate and forming the yttrium or gadolinium-europium oxide phosphor in situ at the temperatures described above. The activator concentration employed in this invention is intended to cover those ranges previously known to the art, normally between about 0.001 and 0.20 moles europium per mole yttrium and/or gadolinium.

Another embodiment of the present invention is illustrated by Example II, and involves the co-precipitation of yttrium and/or gadolinium-europium oxalate. This starting material is then blended with ammonium sulfate, $(NH_4)_2SO_4$ and heat treated between about 300 to 900° C. to form yttrium and/or gadolinium-europium sulfate. This material is then decomposed to the phosphor yttrium and/or gadolinium-europium oxide, $(Y, Eu)_2O_3$, and/or $(Gd, Eu)_2O_3$ in accordance with steps B and C of the first embodiment described in this invention. As in the first embodiment, an important step is the formation of the yttrium europium sulate, $(Y, Eu)_2(SO_4)_3$ with the desired particle size, and then carefully decomposing this material in situ to the phosphor $(Y, EU)_2O_3$. The particle size distribtuion of the $(Y, Eu)_2(SO_4)_3$ is controlled by the amount of $(NH_4)_2SO_4$ added in excess of that required to form the stoichiometric sulfate compound, the amount of flux added, and temperature of heat treatment. Preferably, 0.1 to 1.0 mole of $(NH_4)_2SO_4$ is added in excess of stoichiometric ingredients and 1 to 10 weight percent of alkali metal halide flux is added. Table I illustrates the effect of excess $(NH_4)_2SO_4$ and KCl flux on the average particle size of the final phosphor powder which was formulated in accordance with specifications common to the art, i.e. $(Y_{0.95}Eu_{0.05})_2O_3$, and all heat treated under identical conditions. Also, periodic checks on luminescent brightness and color, shown in Table I, illustrate the absence of any deleterious effects on these important properties as the particle size is varied.

TABLE I
[Variation of particle size of $Y_2O_3$:Eu with $(NH_4)_2SO_4$ and KCl Flux additions]

| Sample: | $(NH_4)_2SO_4$ in excess of stoichiometry, wt. percent | KCl, wt. percent | Particle size (FSSS) | Brightness (percent) | Chromatic coordinates $x$ | $y$ |
|---|---|---|---|---|---|---|
| Control | (¹) | (¹) | 2–3 | 100 | 0.656 | 0.343 |
| A | 0 | 0 | 4.4 | | (²) | (²) |
| B | 20 | 0 | 5.6 | 100 | (²) | (²) |
| C | 40 | 0 | 5.2 | | (²) | (²) |
| D | 0 | 3 | 8.0 | | (²) | (²) |
| E | 20 | 3 | 8.3 | | (²) | (²) |
| G | 40 | 3 | 9.3 | 106 | 0.657 | 0.343 |
| H | 0 | 5 | 11.3 | | (²) | (²) |
| I | 20 | 5 | 12.3 | 96 | (²) | (²) |
| J | 40 | 5 | 13.3 | 98 | (²) | (²) |

¹ Prepared by conventional process.
² Visually equal to control.

The following examples are illustrative of methods which can be employed in the preparation of a phosphor according to the present invention.

EXAMPLE I

The following ingredients are dissolved in HCl or HNO₃ and diluted to 900 ml. with deionized water:

$Y_2O_3$ ----------------------------------- gm__ 107.3
$Eu_2O_3$ ---------------------------------- gm__ 8.800
$H_2SO_4$ (conc.) -------------------------- ml__ 100

Then 1800 ml. of methyl alcohol is added causing (Y, Eu)$_2$(SO$_4$)$_3$·8H$_2$O to precipitate from solution. The quantities given above are essentially equivalent to 0.95 mole of $Y_2O_3$, 0.05 mole of $Eu_2O_3$, and about 10% excess $H_4SO_4$. The precipitated material is then filtered, washed with water and methyl alcohol and dried at 110–155° C. The material is then fired at 1000° C. for one hour, 1150° C. for one hour and 1200–1300° C. for three hours.

EXAMPLE II

The following ingredients are dissolved in HNO₃ and diluted to 1000 ml. with deionized water:

Gm.
$Y_2O_3$ ------------------------------------ 107.3
$Eu_2O_3$ ----------------------------------- 8.800

Then 400 ml. of oxalic acid solution (78 gm. oxalic acid per 100 ml. water) is added while the temperature of the solution is held at 60° C. The yttrium-eruopium oxalate precipitate is digested for 30 minutes at 60° C. The precipitate is filtered, washed with deionized water and dried at 110–155° C. Then the yttrium-europium oxalate is blended with 240 gm. $(NH_4)_2SO_4$ and fired at 800° C. for two hours. The (Y, Eu)$_2$(SO$_4$)$_3$ is then blended with 9.3 gm. of KCl and refired at 1300° C. for three hours.

EXAMPLE III

The following ingredients are dissolved in HNO₃ and diluted to 1000 ml. with deionized water:

$Gd_2O_3$ ---------------------------------- gm__ 172.2
$Eu_2O_3$ ---------------------------------- gm__ 8.800
$H_2SO_4$ (conc.) -------------------------- ml__ 100

Then 1800 ml. of methyl alcohol is added causing (Gd, Eu)$_2$(SO$_4$)$_3$·8H$_2$O to precipitate from solution. The quantities given above are essentially equivalent to 0.95 mole of $Gd_2O_3$, 0.05 mole of $Eu_2O_3$, and about 10% excess $H_2SO_4$. The precipitated material is then filtered, washed with water and methyl alcohol and dried at 110–155° C. The material is then fired at 1000° C. for one hour, 1150° C. for one hour and 1200–1300° C. for three hours.

EXAMPLE IV

The following ingredients are dissolved in HNO₃ and diluted to 1000 ml. with deionized water:

Gm.
$Gd_2O_3$ ---------------------------------- 172.2
$Eu_2O_3$ ---------------------------------- 8.800

Then 400 ml. of oxalic acid solution (78 gm. oxalic acid per 100 ml. water) is added while the temperature of the solution is held at 60° C. The gadolinium-europium oxalate precipitate is digested for 30 minutes at 60° C. The precipitate is filtered, washed with deionized water and dried at 110–155° C. Then the gadolinium-europium oxalate is blended with 240 gm. $(NH_4)_2SO_4$ and fired at 800° C. for two hours. The (Gd, Eu)$_2$(SO$_4$)$_3$ is then blended with 9.3 gm. of KCl and refired at 1300° C. for three hours.

As our invention, we claim:

1. In the process of preparing a rare earth metal oxide phosphor having controlled particle sizes, the steps which comprise: forming a solution of the sulfate of at least one matrix forming member selected from the group consisting of yttrium and gadolinium plus at least one activator forming member selected from the group consisting of europium, terbium, samarium and praseodymium, crystallizing and coprecipitating the yttrium and/or gadolinium sulfate plus the sulfate of said activator forming member; firing the sulfates to substantially remove two SO₃ molecules from each of the sulfate molecules and produce a residue of the sulfate then continuing said firing to substantially remove one additional molecule of SO₃ from said residue and produce the oxide phosphor.

2. The process according to claim 1 wherein said sulfate is first fired at a temperature between about 850 to 1150° C. and second fired at a temperature between about 1000 to 1300° C.

3. The process according to claim 2 wherein an alkali metal halide flux is mixed with said sulfate.

References Cited

UNITED STATES PATENTS 3,250,722   5/1966   Borchardt _____ 252—301.4
3,322,682   5/1967   Thompson _____ 252—301.4

OTHER REFERENCES

Wendlandt, The Thermal Decomposition of Yttrium and the Rare Earth Metal Sulfates Hydrates, J. Inorg. Nucl. Chem., 1958, vol. 7, pp. 51–54.

Chemical Abstracts, vol. 65, No. 10, November 1966, p. 14,626n.

ROBERT D. EDMONDS, Primary Examiner